United States Patent
Wilson

(10) Patent No.: US 10,148,491 B2
(45) Date of Patent: Dec. 4, 2018

(54) ITERATIVE ALGORITHM FOR RAPID FAULT ISOLATION

(71) Applicant: Adtran, Inc., Huntsville, AL (US)

(72) Inventor: Arlynn W. Wilson, Huntsville, AL (US)

(73) Assignee: ADTRAN, INC., Huntsville, AL (US)

( * ) Notice: Subject to any disclaimer, the term of this patent is extended or adjusted under 35 U.S.C. 154(b) by 427 days.

(21) Appl. No.: 14/861,130

(22) Filed: Sep. 22, 2015

(65) Prior Publication Data
US 2016/0087832 A1    Mar. 24, 2016

Related U.S. Application Data

(60) Provisional application No. 62/054,114, filed on Sep. 23, 2014.

(51) Int. Cl.
*H04L 12/24* (2006.01)
*H04L 1/24* (2006.01)

(52) U.S. Cl.
CPC ............ *H04L 41/0677* (2013.01); *H04L 1/24* (2013.01)

(58) Field of Classification Search
CPC ............ G01R 31/3181; G01R 29/0273; G01R 31/025; G01R 31/31922; G01R 31/11; G01R 31/318342; G01R 31/31917; H03F 2200/351; H03F 1/523
See application file for complete search history.

(56) References Cited

U.S. PATENT DOCUMENTS

| | | | | |
|---|---|---|---|---|
| 2003/0016044 A1* | 1/2003 | Ishida | ............... | G01R 31/3004 324/762.02 |
| 2004/0097914 A1* | 5/2004 | Pantera | .............. | A61B 18/1206 606/34 |
| 2005/0093622 A1* | 5/2005 | Lee | ......................... | H03F 1/523 330/10 |
| 2010/0067608 A1* | 3/2010 | Tyree | .................... | F41G 7/2246 375/285 |
| 2011/0012575 A1* | 1/2011 | Midya | ..................... | H02M 1/44 323/282 |
| 2011/0249370 A1* | 10/2011 | Nayak | .................. | H02H 1/0015 361/42 |
| 2012/0229939 A1* | 9/2012 | Mikani | ................ | H02H 1/0015 361/55 |

* cited by examiner

Primary Examiner — Romani Ohri
(74) Attorney, Agent, or Firm — Fish & Richardson P.C.

(57) ABSTRACT

Methods, systems, and apparatus for detecting fault are disclosed. In one aspect, a signal having an initial pulse width is transmitted on a telecommunication line. A fault location index is identified based on at least one fluctuating echo tap of the signal. An updated pulse width is determined based on the initial pulse width and the fault location index. The fault location index is updated based on at least one fluctuating echo tap of an updated signal having the updated pulse width.

28 Claims, 6 Drawing Sheets

FIG. 2B

ITERATIVE ALGORITHM FOR RAPID FAULT ISOLATION

BACKGROUND

This specification relates to fault detection and location isolation in pulsed systems such as pulse amplitude modulated (PAM) communication systems and optical time domain reflectometers (OTDR).

Telecommunication lines, such as digital subscriber lines (DSLs), may include sections of wires that have been joined together to form a data path from one location to another. A point where two sections of a telecommunication line are joined is referred to as a "splice." In forming a splice, the end of one section may be wrapped around or otherwise joined to the end of another section. The two joined ends may be soldered to prevent the splice from becoming loose or crimped with Scotch Lock connectors or crimped to a 710 connector or similar cable splicing device.

It is generally desirable for a splice to remain in a tightly joined position to reduce the resistivity of the splice. However, a splice may become degraded (e.g., loose) over time. In such a case, the resistivity of the splice may fluctuate, which may disrupt communications occurring over the telecommunication line that includes the faulty splice. In an optical system, the fault may be a fiber break or a crimping of the fiber resulting in degraded performance or complete loss of communication.

SUMMARY

This invention provides a method to iteratively reduce the location uncertainty for detections obtained through pulsed systems in which the pulse width may be varied.

Particular embodiments of the subject matter described in this specification can be implemented so as to realize one or more of the following advantages. The locations of faults can be determined with better resolution by iteratively changing the pulse width using a pulse width selection technique. The location of the fault can also be identified more quickly when the pulse width is changed according to the pulse width selection technique, which reduces the time and cost to find the fault in the field. The techniques disclosed are also performed using telecommunications equipment that is installed in the telecommunications network, thereby enabling the fault location to be detected using existing equipment without disrupting communications over the network.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2B is an example screen display of fault detection output.

Like reference numbers and designations in the various drawings indicate like elements.

DETAILED DESCRIPTION

Locating and repairing a fault may improve the transmission quality of a telecommunication line. However, detecting the location of a fault may be difficult because disruptions of communications over a telecommunication line may be caused by a number of factors in addition to or in lieu of faulty splices. Furthermore, many telecommunication lines extend for very long distances and are often buried in the ground. Therefore, even when a fault problem is diagnosed, locating the fault can be difficult and expensive, particularly if the location of the fault is not accurately determined prior to attempting to access the portion of the telecommunications lines at which the fault is believed to be located.

As discussed in more detail below, a fault location can be detected based on transmissions of signals with different pulse widths using, for example, existing telecommunications equipment. For example, as discussed in detail with respect to FIG. 1 and FIG. 2A, a signal having an initial pulse width is transmitted on a telecommunication line. The signal is evaluated as it propagates through the telecommunication line and a faulty spice location is detected based on the evaluation. The initial pulse width and the detected faulty spice location constrain the uncertainty bounds for the updated pulse width. An updated pulse width is selected based on satisfying the uncertainty bounds. An updated signal having the updated pulse width is transmitted and an updated faulty spice location is detected based on evaluations of the updated signal. In some cases, this technique can be repeated to refine the resolution of the detected faulty spice location.

The techniques described herein may provide one or more advantages. This approach may improve the resolution of fault detection and therefore expedite the process of locating and repairing the faulty splice. For example, by determining an updated pulse width based on the initial pulse width and the fault location index, a Fault Detection System (FDS) may identify a sequence of pulse widths that will quickly refine the location of the faulty splice.

Figure 1:
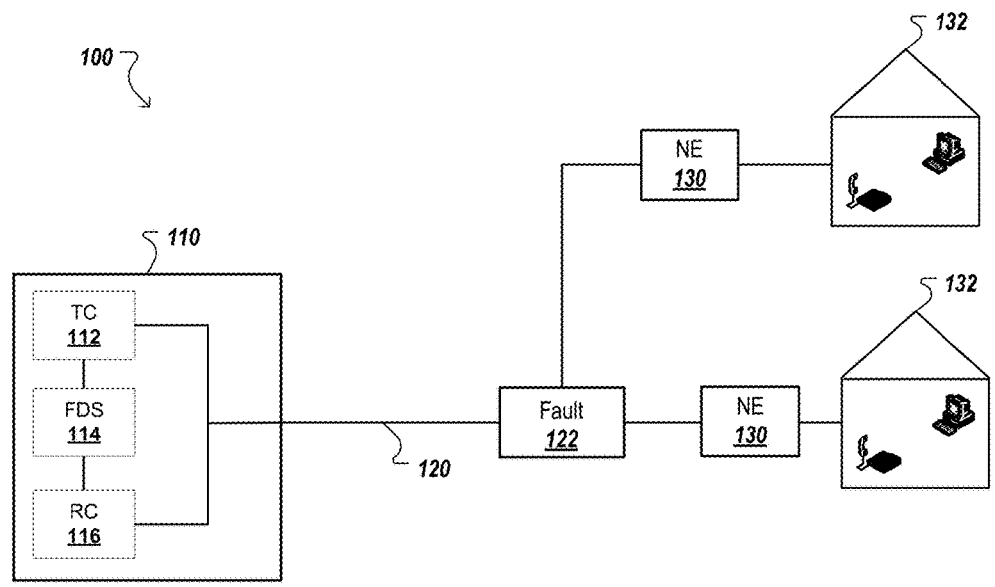
FIG. 1 is a block diagram of an example environment in which a Fault Detection System can be used.

FIG. 1 is a block diagram of an example environment 100 in which a Fault Detection System (FDS) can be used. The example environment 100 includes a transceiver 110 that is connected to a telecommunication line 120. In some implementations, the transceiver 110 can reside at a central office of a communication network. In some implementations, the transceiver 110 can reside at one or more end user locations 132, or other locations.

The telecommunication line 120 is connected to a network element 130. The telecommunication line 120 includes sections of wires that are joined together (e.g., by splices) to provide communication paths in a network. In some implementations, the telecommunication line 120 can be a Digital Subscriber Line (DSL) transmission line. In some cases, points on the telecommunication line 120 can be represented by location indices, where each location index represents a point on the telecommunication line 120.

The network elements 130 provides a communication channel from the network to the end user location 132. The network elements 130 can include, for example, a wireless access point that communicates wirelessly with communications devices at an end user location 132. The network elements 130 can also include a wire line path with communications devices located at another end user location 132. The user locations 132 can include, for example, a business location or a residence location.

If the telecommunications line 120 has a fault 122 located between the transceiver 110 and the network elements 130, the fault 122 may degrade or otherwise interrupt services provided to the end user locations 132 by the network elements 130. Therefore, a network operator will generally want to identify the location of the fault 122 as quickly as possible to repair the faulty splice.

In some implementations, the transceiver can be configured to facilitate rapid detection of the a faulty splice, and provide the location of the fault with enough specificity that repair crews can limit the section of the telecommunications line that needs to be inspected. As discussed in more detail below, the transceiver 110 identifies the location of the fault by transmitting signals of various pulse widths downstream (e.g., propagating toward the end user location 132) and evaluating upstream signals (e.g., propagating toward the transceiver 110), which provides an indication of where a fault is located.

In some implementations, the transceiver 110 can include a Transmitter Circuit (TC) 112, a Receiver Circuit (RC) 116, and a Fault Detection System (FDS) 114 coupled to both the TC 112 and the RC 116.

The TC 112 is a variable pulse width transmitter configured to transmit signals having different pulse widths. In some implementations, the signals can be variable data rate signals. For example, the signal may be a Symmetrical High-bit-rate Digital Subscriber Line (SHDSL) signal. In some implementations, the data rates transmitted by the SHDSL signal can increase in quantum steps. For example, the data rate can increase in steps of 8, 16, 32, 64 kbps, or other steps. In some cases, the level of increments can depend on the number of pairs of wires used to transmit the SHDSL signal. In some implementations, the pulse width of a signal can depend on the data rate of the signal. For example, a SHDSL signal transmitted at 1024 kbps can have a pulse width of 827 feet, while a SHDSL signal transmitted at 512 kbps can have a pulse width of 1654 feet.

The TC 112 may include any hardware, software, firmware, or combination thereof configured to transmit a digital data signal. In some implementations, the TC 112 can include a digital signal transmitter, a digital filter, a D/A converter, an analog filter, a hybrid network, a transformer, and/or other components. In some implementations, the digital signal transmitter transmits digital signals, the digital filter filters the digital signals, the D/A converter converts the filtered digital signal into an analog signal, and the analog filter filters the analog signal. The filtered analog signal can be transmitted on the telecommunication line 120. In some implementations, the filtered analog signal can be transmitted on the telecommunication line 120 via a hybrid network (e.g., a network including optical fibers and coaxial cables or twisted pair cables) and a line-coupling transformer. In some implementations, the TC 112 may include an optical transmitter to transmit signal over optical cables.

The RC 116 can include any hardware, software, firmware, or combination thereof configured to receive a digital data signal. In some implementations, the RC 116 can include a digital signal receiver, a digital filter, an A/D converter, an analog filter, a hybrid network, a transformer, a differential summer, and other components. In some implementations, an analog signal on the telecommunication line 120 can be coupled through the transformer and the hybrid network before being applied to the analog filter. In some implementations, the analog filter filters the analog signal, the A/D converter converts the filtered analog signal to a digital signal, and the digital filter filters the digital signal. In some implementations, the RC 116 can use a differential summer to remove echoes of transmitted digital signal from the received digital signal. In some implementations, the differential summer can remove echoes by combining the filtered digital signal with an echo cancellation signal provided by the FDS 114.

Figure 2A:
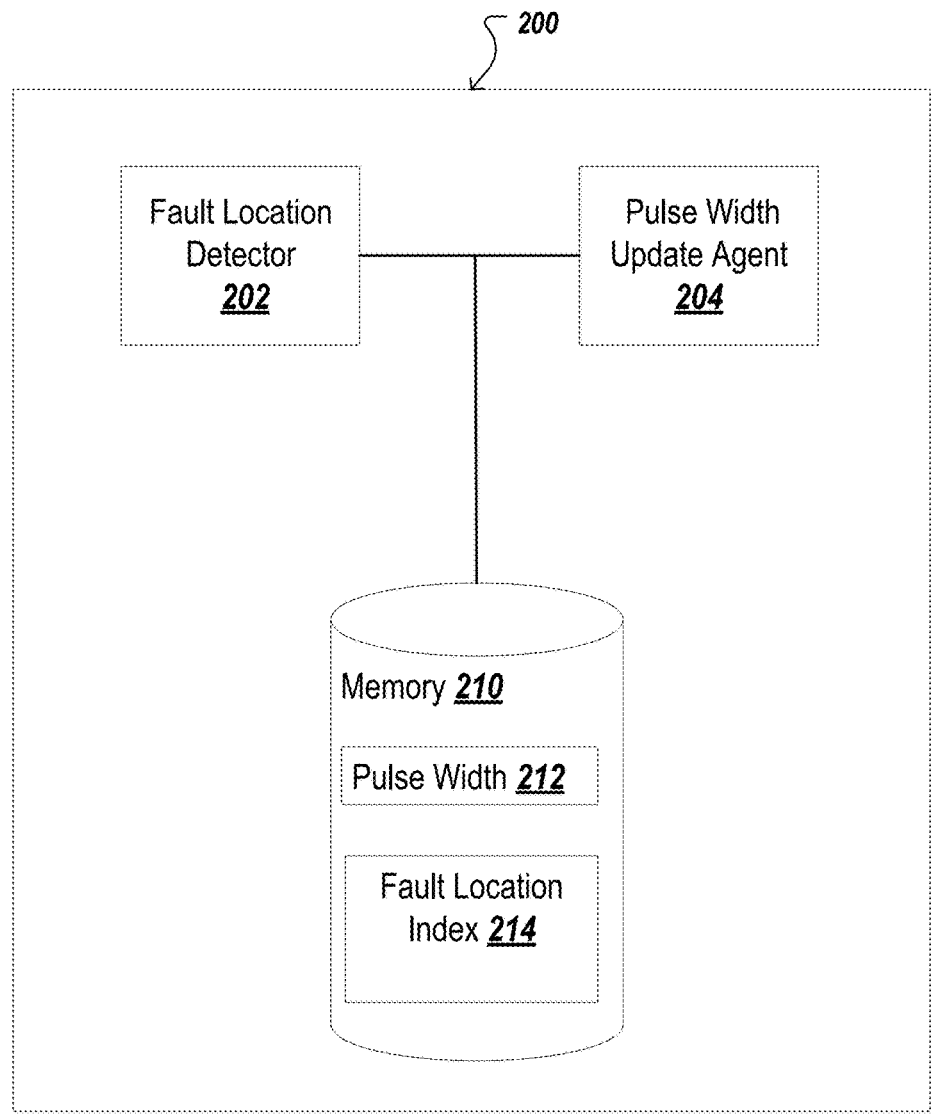
FIG. 2A is a schematic of an example Fault Detection System.

The FDS 114 can include any hardware, software, firmware, or combination thereof configured to identify a fault location index and determine an updated pulse width that will be used to reduce the uncertainty of the location of the fault (e.g., more specifically identify the location of the faulty splice). In some implementations, the FDS 114 can also include any hardware, software, firmware, or combination thereof configured to provide an echo cancellation signal to the RC 116 to remove echoes from the received digital signal. FIG. 2A and associated descriptions provide additional details of an example implementation of the FDS 114.

In operation, the TC 112 transmits a signal having an initial pulse width on a the telecommunication line 120. As discussed in more detail in FIG. 2A and associated descriptions, the FDS 114 identifies a fault location index and determines an updated pulse width based on the initial pulse width and the fault location index. In some implementations, the FDS 114 can provide an echo cancellation signal to the RC 116 and identify the fault location index based on at least one fluctuating echo tap of the signal, For example, as described in more details with reference to FIG. 2A, a faulty spice may cause a fluctuation in tap coefficients associated with an echo tap of the signal and the FDS 114 may identify the fault location index representing a point on the telecommunication line 120 that correlates to the echo tap.

The TC 112 transmits the updated signal having the updated pulse width. The FDS 114 updates the fault location index, for example, FDS 114 may update the fault location based on at least one fluctuating echo tap of the updated signal in a manner similar to the technique discussed above. In some cases, the fluctuating echo tap of the updated signal may include a fluctuation in an OTDR reflection or an OTDR tap response.

In some implementations, the FDS 114 can indicate the updated pulse width to the TC 112 so that the TC 112 can transmit the updated signal having the updated pulse width. Alternatively or additionally, the TC 112 can transmit signals with different pulse width, and the FDS can identify the updated splice location based on signals that have the updated pulse width. In some implementations, this approach can be repeated until one or more completion criteria are met. In some implementations, the one or more completion criteria can include the updated pulse width being less than a predetermined pulse width. In some implementations, the one or more completion criteria can include the number of iterations exceeding a predetermined number of iterations. In some implementations, the network element 130 may also include a FDS that identifies a fault location index and determine an updated pulse width.

FIG. 2A is a schematic of an example Fault Detection System (FDS) 200. The example FDS 200 includes a Fault Location Detector (FLD) 202, a Pulse Width Update Agent (PWUA) 204, and memory 210.

In operation, the FLD 202 identifies a fault location index 214. In some implementations, the FLD 202 can identify the fault location index 214 based on at least one fluctuating echo tap of the signal having a pulse width 212. The PWUA 204 determines an updated pulse width based on the fault location index 214 and the pulse width 212. In some implementations, the pulse width 212 and the fault locations index 214 can be stored in the memory 210 and accessed by the FLD 202 and the PWUA 204. In some implementations, the updated pulse width can be sent to the TC 112 so that the TC 112 can transmit an updated signal having the updated pulse width associated with a second communication data rate. The FLD 202 can identify an updated fault location index based on the updated signal and the PWUA 204 can further update the next pulse width.

The FLD 202 may include any hardware, software, firmware, or combination thereof configured to determine a fault location index 214. In some implementations, a fault location index 214 can be determined based on at least one fluctuating echo tap of the signal having a pulse width 212. For example, the FLD 202 may include an echo canceler to output an echo cancellation signal to the RC 116. In some cases, the echo canceler can be implemented as a linear adaptive finite impulse response filter. In some implementations, the echo canceler can use a plurality of echo taps, each corresponding to a tap coefficient, to delay replicas of the signal transmitted by the TC 112 in order to output an appropriate echo cancellation signal.

In some cases, changes in the resistivity of the telecommunication line 120 can induce changes in the tap coefficients used by the echo canceler to produce an adequate cancellation signal. A fluctuation in the resistivity of the telecommunication line 120 can have different effects on certain ones of the tap coefficients depending on the location of the resistivity fluctuation along the telecommunication line 120. Each tap coefficient therefore can be correlated with a particular point along the telecommunication line 120. In some cases, a fault may change the resistance of a point along the telecommunication line 120. Therefore, the location of the fault can be detected by determining which tap coefficient is affected by the resistance fluctuation. In some implementations, the FLD 202 can store a set of baseline tap coefficients and periodically monitor the current tap coefficients. If the FLD 202 determines that a current tap coefficient associated with a particular echo tap is significantly different from the baseline tap coefficient associated with the same tap, the FLD 202 can determine that a fault resides at the location correlated to the echo tap. The FLD 202 can therefore identify a fault location index 214 representing the location of the faulty splice.

In some implementations, the FLD 202 can use a fluctuation threshold to determine whether a significant fluctuation occurs in order to reduce the effect of fluctuation noise. For example, the FLD 202 may identify a fault location index after the fluctuation of an echo tap of a signal exceeds the fluctuation threshold. In some implementations, the FLD 202 may count the number of times a fluctuation threshold is exceeded for a certain echo tap to determine whether a fault is detected at the location associated with the tap. In some implementations, the FLD 202 can track the history of the fluctuating echo taps to adjust the fluctuation threshold to further improve the detection accuracy.

Alternatively on in combination, the FLD 202 can use correlation optical time domain reflectometers (OTDRs) to determine a fault location index 214. For example, a signal having a pulse width may be transmitted on a telecommunication line 120. In some cases, the signal can be transmitted by the TC 112. In some cases, the telecommunication line 120 can be an optical fiber and the signal can be a light signal. A portion of the signal, e.g., reflections, may be returned toward the transmitter from each point along the telecommunication line 120. The reflections may be produced by scattering of the signal along the length of the telecommunication line 120 and in some cases by localized reflections at particular points along the fiber. In some cases, more attenuation can occur as the signal passes through a faulty splice. Therefore, the FLD 202 may identify a fault location index 214 by correlating the transmitted signal with the reflections and determining the extent of the attenuation associated with each location on the telecommunication line 120. Other techniques to determine a fault location index 214 may also be used.

Figure 3:
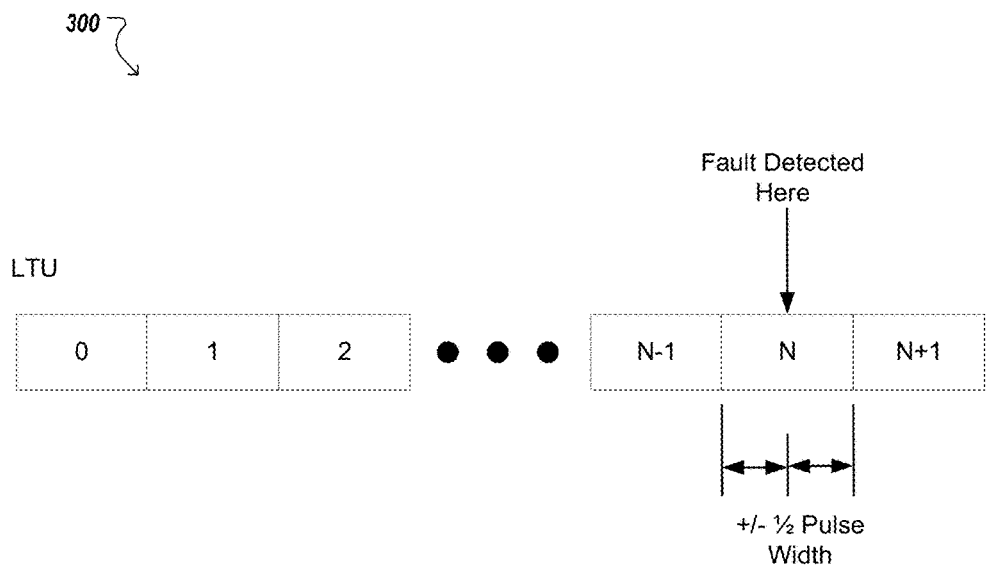
FIG. 3 is a schematic illustrating the resolution of a fault detection based on transmitting a signal having an initial pulse width.

In some implementations, the resolution of the fault location can depend on the pulse width of the signal transmitted by TC 112. For example, if the signal has a pulse width of 827 feet, the resolution of the fault location detected by the FLD 202 can have a resolution of 827 feet. FIG. 3 and associated descriptions provide additional details of these implementations.

The PWUA 204 may include any hardware, software, firmware, or combination thereof configured to determine an updated pulse width based on the fault location index 214 and the pulse width 212. In some implementations, the PWUA 204 can determine the updated pulse width based on a set of inequality relationships. In some implementations, the set of inequality relationships can include two inequality relationships. In the first inequality relationship, a product of the updated pulse width and a sum of an updated location index and an integer is greater than a product of the pulse width 212 and a difference between the fault location index 214 and ½. In the second inequality relationship, a product of the updated pulse width and a sum of the updated location index, the integer, and 1 is less than a product of the pulse width 212 and a sum of the fault location index 214 and ½. Following is an example of the set of inequality relationships, which includes inequality relationship (1) and inequality relationship (2):

$$(N_{k+1}+I) \times \Delta_{k+1} > (N_k - \tfrac{1}{2}) \times \Delta_k \qquad (1)$$

$$(N_{k+1}+I+1) \times \Delta_{k+1} < (N_k + \tfrac{1}{2}) \times \Delta k \qquad (2)$$

where $N_k$ represents the fault location index 214, $\Delta_k$ represents the pulse width 212, $\Delta_{k+1}$ represents the updated pulse width, $N_{k+1}$ represents the updated location index, and I represents the integer. In some implementations, the PWUA 204 can determine the updated pulse width by selecting a pulse width that satisfies the above inequality relationships.

Figure 4:
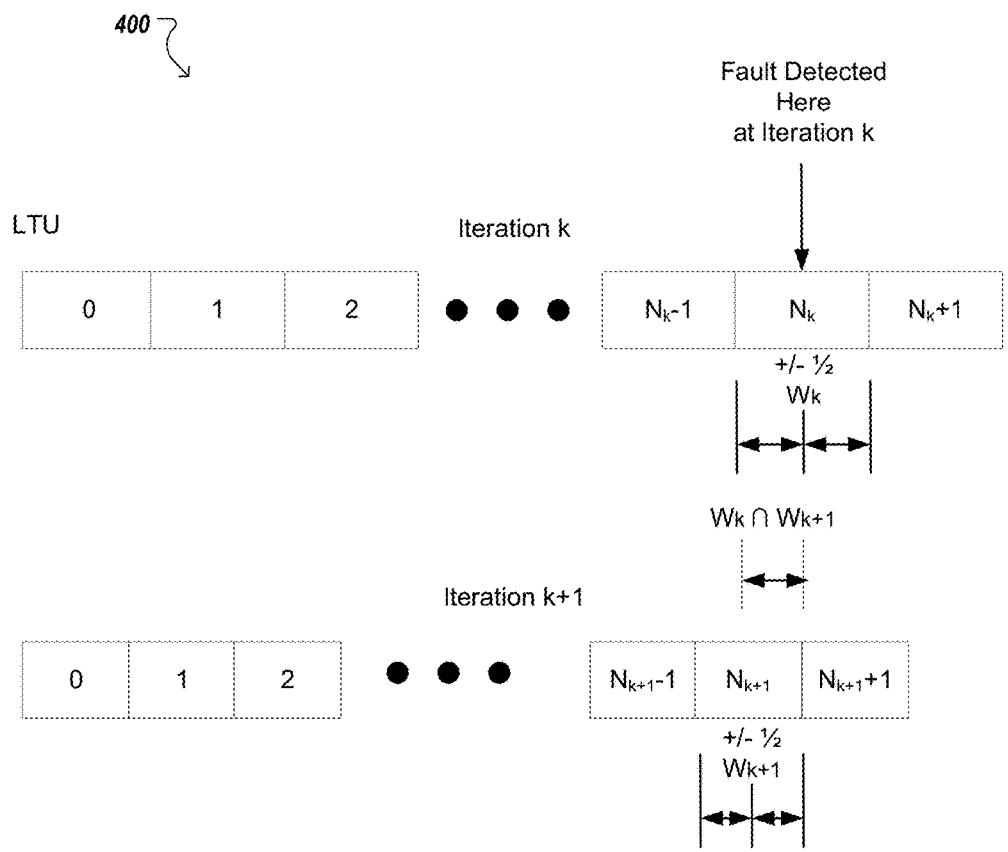
FIG. 4 is a schematic illustrating resolutions of fault detections based on an example iterative technique.

The inequality relationships above are generalized to constrain the updated pulse width by any integer I. If I is smaller than zero, the directions of the inequality relationships reverse, i.e., less-than becomes greater-than and vice versa. In some cases, I can be set to 0. FIG. 4 and associated descriptions provide additional details of these implementations.

In some cases, the transmission channel over the telecommunication line may be band-limited. Therefore, in these cases, selecting a smaller pulse width, which corresponding to a higher pulse rate, may produce higher Bit Error Rate (BER) and therefore higher errors. In these or other cases, the Signal to Noise Ratio (SNR) of the signal in the previous iteration may be used to determine whether to choose a larger or a smaller pulse width for the next iteration. For example, if the SNR of the signal in the previous iteration is high, e.g., higher than a predetermined threshold, then a reduced pulse width that satisfy the above inequality relationships may be selected for the next iteration. If the SNR of the signal in the previous iteration is low, e.g., lower than a predetermined threshold, then a increased pulse width that satisfy the above inequality relationships may be selected for the next iteration.

In some implementations, the technique described above can be repeated. For example, after the PWUA 204 determines an updated pulse width, the TC 112 may transmit an updated signal having the updated pulse width. The FLD 202 may identify an updated fault location index based on the updated signal having the updated pulse width. The updated pulse width is smaller than the pulse width 212, and therefore the resolution of the updated fault location is more precise than the fault location identified from the previous signal.

In some implementations, the technique can be repeated until one or more completion criteria are met. In some cases, the one or more completion criteria can include a predetermined pulse width. For example, the technique may end when the updated pulse width is smaller than the predetermined pulse width. In such a case, the resolution of the fault detection is reduced to within a predetermined amount. In some cases, the predetermined pulse width can be determined based on user inputs, values stored in a database, or characteristics of the telecommunication network. Alternatively or in combination, the one or more completion criteria can include a maximum number of iterations. For example, the technique can end when the number of iterations exceeds a predetermined number. In some cases, the predetermined number can be determined based on user inputs, values stored in a database, or characteristics of the telecommunication network.

In some implementations, the pulse width of a signal can be proportional to the speed of light and inversely proportional to the symbol rate of the signal. Therefore, the inequality relationships (1) and (2) can be rewritten in terms of the data rate of the signal as the following:

$$\frac{(N_{k+1}+I+1)}{\left(N_k+\frac{1}{2}\right)} \times R_k < R_{k+1} < \frac{(N_{k+1}+I)}{\left(N_k-\frac{1}{2}\right)} \times R_k \quad (3)$$

where $R_k$ and $R_{k+1}$ represent the data rate of the signal at the k-th and (k+1)-th iteration, respectively.

In some cases, the signal can be a variable data rate signal. For example, the signal can be a SHDSL signal, which has a set of data rates that increase in quantum steps. Therefore, the FDS 200 can use the inequality relationship (3) (or inequality relationships (1) and (2)) described above to select a suitable data rate in the set of data rates for the next iteration. In some implementations, the iteration process described above can be automated. For example, the data rate of the signal may vary rapidly in real time. In such a case, the intersection of the uncertainty bounds at each iteration can be recorded and iteratively reduced and reported.

The fault detection can be made from either the Line Termination Unit (LTU) side or the Network Termination Unit (NTU) side. For example, if the fault detection is made from the LTU side, the location index can start from the LTU side at 0 and increase along the telecommunication line 120. If the fault detection is made from the NTU side, the location index can start from the NTU side at 0 and increase along the telecommunication line 120 in the opposite direction. In some cases, the fault detection can be made from both the LTU side and the NTU side. In such a case, the FLD 202 can detect a faulty location index from the LTU side according to the techniques described above. Similarly, the FLD 202 can determine a supplemental faulty location index from the NTU side. In such a case, the PWUA 204 can determine an updated pulse width based on two sets of inequality relationships. One set of the inequality relationships can include the inequality relationships described above, where $N_k$ and $N_{k+1}$ represent location indices from the LTU side. The other set of the inequality relationships can include the same inequality relationships described above, where $N_k$ and $N_{k+1}$ represent location indices from the NTU side. The PWUA 204 can determine the updated pulse width by selecting a pulse width that satisfies both sets of inequality relationships.

The memory 210 stores the pulse width 212 and the fault location index 214 for one or more iterations. In some implementations, the memory 210 can provide mass storage for the FDS 200 to store additional information. In some implementations, the memory 210 can include, for example, a random access memory (RAM), a storage device (e.g., a writable read-only memory (ROM) or others), a hard disk, or another type of storage medium.

In some implementations, the memory 210 can be or contain a non-transitory computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier can be a computer- or machine-readable medium, such as the memory 210. In some implementations, the FDS 200 can be preprogrammed or it can be programmed (and reprogrammed) by loading a program from another source (e.g., from a CD-ROM, from another computer device through a data network, or in another manner) on the memory 210.

In some implementations, the memory 210, or other components of the FDS 200 can inform the TC 112 of the updated pulse width determined by the PWUA 204. Alternatively or in combination, the TC 112 can access the memory 210 to retrieve the updated pulse width.

Figure 2B:
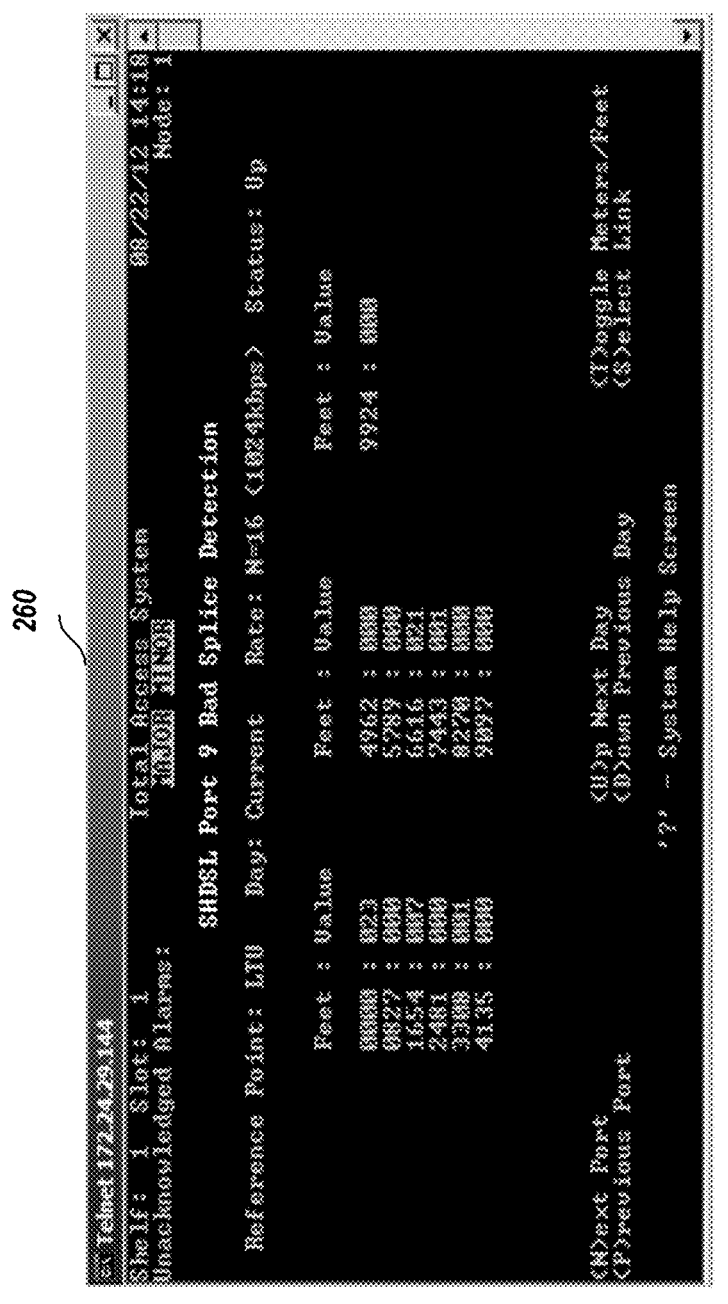

FIG. 2B is an example screen display 260 of fault detection output. In the illustrated example 260, the output of a fault detection at one iteration is displayed. In the illustrated iteration, a signal is transmitted at 1024 kbps, which corresponds to a pulse width of 827 feet. The reference point is LTU, which indicates that the location indices start from the LTU side. A significant number of fluctuations are detected at the echo tap corresponding to port 9, which is 6616 feet from the LTU side. Therefore, a fault location index 8, which corresponds to port 9, is identified at this iteration.

FIG. 3 is a schematic 300 illustrating the resolution of a fault detection based on transmitting a signal having an initial pulse width. In the illustrated example, location indices (e.g., 0, 1, . . . , N, N+1 . . . , ) are numbered from the LTU side. As described previously, the TC 112 transmits a signal having an initial pulse width on the telecommunication line 120. The FDS 200 detects a fault and identifies a fault location index N. The detected fault location has a resolution that is equal to the pulse width. In other words, the fault may be located within one half of the pulse width from either direction of the detected fault location.

FIG. 4 is a schematic 400 illustrating resolutions of fault detections based on an example iterative technique. In the illustrated example, location indices (e.g., 0, 1, ..., $N_k$, $N_k+1$ ..., ) are numbered from the LTU side. At k-th iteration, the fault detection has a resolution that is equal to the pulse width of the signal at k-th iteration ($W_k$). At (k+1)-th iteration, the FDS 200 determines an updated pulse width ($W_{k+1}$) that satisfies inequality relationships (1) and (2), where I is 0. The FDS 200 updates the fault location index based on an updated signal having the updated pulse width. In the illustrated example, the updated fault location index can be either $N_{k+1}$ or $N_{k+1}+1$. Therefore, the resolution of fault detection at (k+1)-th iteration is reduced from $W_k$ to $W_{k+1}$.

In some cases, the resolution of the fault detection can be further reduced based on the uncertainty regions obtained in consecutive iterations. For example, as shown in FIG. 4, at k-th iteration, it is determined that the fault location may reside in the uncertainty region $W_k$. Similarly, at (k+1)-th iteration, it is determined that the fault location may reside in the uncertainty region $W_{k+1}$. In some implementations, the fault location may be determined to be within the intersection of these two regions, represented by $W_k \cap W_{k+1}$. In these or other cases, an integer value of a pulse width that falls within the reduced uncertainty region $W_k \cap W_{k+1}$. may be selected as the next pulse width Accordingly, as subsequent iterations are performed, the location of the fault will be known with greater certainty.

Figure 5:
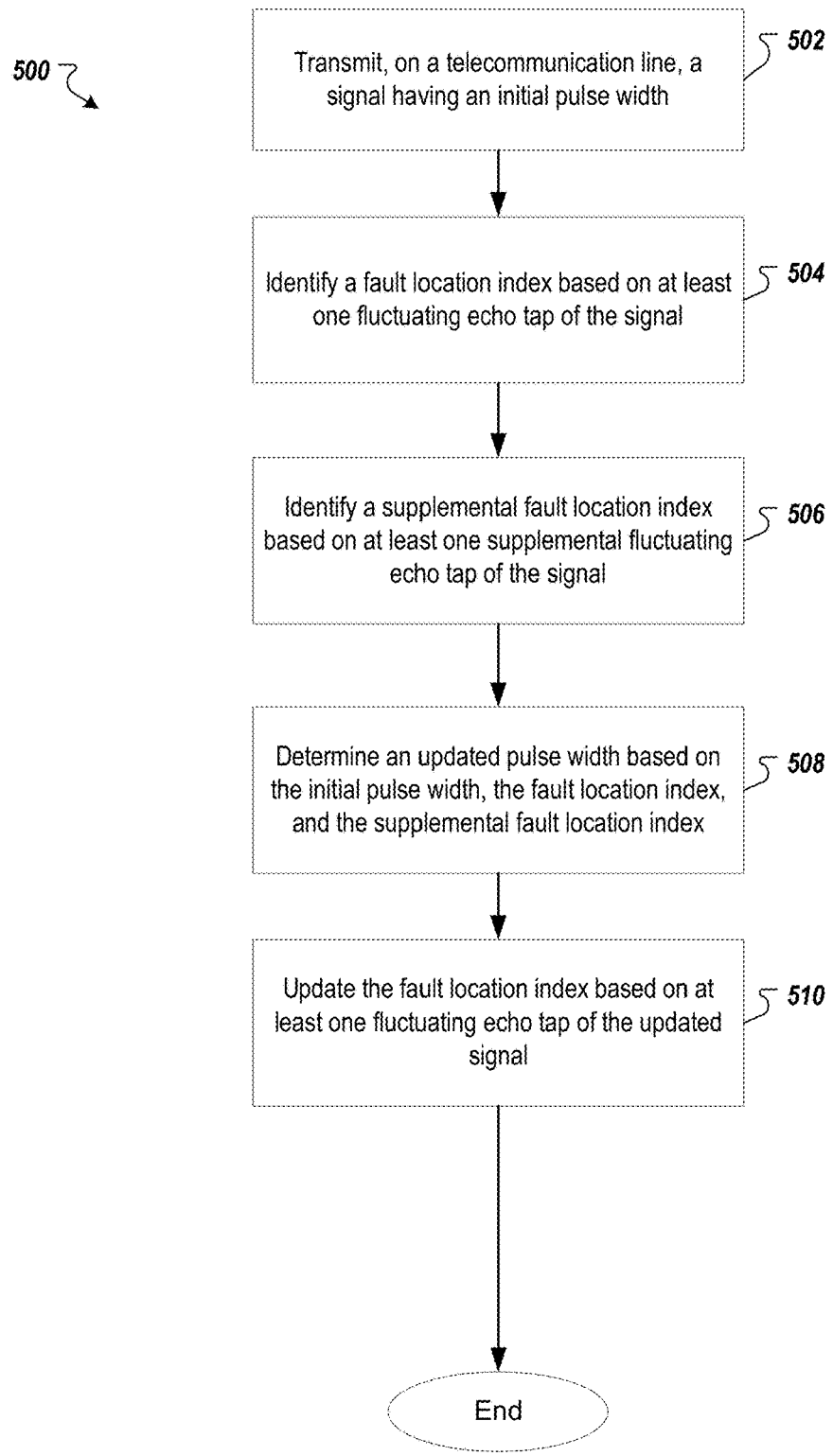
FIG. 5 is a flow chart of an example process for detecting fault locations.

FIG. 5 is a flow chart of an example process 500 for detecting fault locations. The example process 500 can be performed, for example, by one or more devices such as those described with reference to FIG. 1 and FIG. 2A. The example process 500 can also be implemented as instructions stored on a non-transitory computer readable medium that when executed by one or more devices cause the one or more devices to be configured to perform the operations of the process 500.

The example process 500 begins at 502, where a signal having an initial pulse width is transmitted on a telecommunication line. In some implementations, the signal can be a variable data rate signal, as discussed above.

At 504, a fault location index is identified. In some implementations, the fault location index can be identified based on at least one fluctuating echo tap of the signal. For example, as discussed above, a fluctuation in tap coefficients associated with an echo tap of the signal can be detected. A fault location index that correlates to the fluctuating echo tap can be identified. In some implementations, at 506, a supplemental fault location is identified. The supplemental fault location index can be identified based on at least one supplemental fluctuating echo tap of the signal.

At 506, an updated pulse width is determined. In some implementations, the updated pulse width can be determined based on the initial pulse width and the fault location index. In some implementations, determining the updated pulse width can include determining the updated pulse width based on at least one inequality relationship of the fault location index and the initial pulse width. The at least one inequality relationship can include two inequality relationships. In the first inequality relationship, a product of the updated pulse width and a sum of an updated location index and an integer can be greater than a product of the initial pulse width and a difference between the fault location index and ½. In the second inequality relationship, a product of the updated pulse width and a sum of the updated location index, the integer, and 1 can be less than a product of the initial pulse width and a sum of the fault location index and ½. In some cases, the integer can be set to 0.

In some implementations, the updated pulse width can be determined based on the initial pulse width, the fault location index, and the supplemental fault location index. In some implementations, determining the updated pulse width can include determining the updated pulse width based on at least one inequality relationship of the fault location index and the initial pulse width and at least one inequality relationship of the supplemental fault location index and the initial pulse width, as discussed above with reference to FIG. 2A.

At 510, the fault location index is updated. In some implementations, the fault location index can be updated based on at least one fluctuating echo tap of an updated signal having the updated pulse width. In some implementations, updating the fault location index can include repeating some or all of 502, 504, 506, and 508 until one or more completion criteria are met. In some cases, the one or more completion criteria can include the updated pulse width being less than a predetermined pulse width.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination or in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method, comprising:
   transmitting, on a telecommunication line, a first pulse amplitude communication signal having an initial pulse width; and
   after transmitting the first pulse amplitude communication signal on the telecommunication line:
   identifying a first fault location index based on an echo of the first pulse amplitude communication signal, wherein the first fault location index represents a location of a fault on the telecommunications line;
   determining an updated pulse amplitude communication signal having an updated pulse width based on the initial pulse width and the identified first fault location index;
   transmitting, on the telecommunication line, a second pulse amplitude communication signal having the updated pulse width; and
   identifying a second fault location index based on at least one fluctuating echo of the second pulse amplitude communication signal having the updated pulse width, wherein the second fault location index represents an updated location of the fault on the telecommunications line.

2. The method of claim 1, wherein the first fault location index is identified based on a fluctuating echo of the first pulse amplitude communication signal.

3. The method of claim 1, wherein determining the updated pulse width comprises determining the updated pulse width based on at least one inequality relationship of the first fault location index and the initial pulse width.

4. The method of claim 3, wherein the at least one inequality relationship comprises:

$$(N_{k+1}+I) \times \Delta_{K+1} > (N_k - \tfrac{1}{2}) \times \Delta_K;\ \text{and}$$

$$(N_{k+1}+I+1) \times \Delta_{K+1} < (N_k + \tfrac{1}{2}) \times \Delta K,$$

wherein $N_k$ is the first fault location index, $N_{k+1}$ is the second fault location index, $\Delta_K$ is the initial pulse width, $\Delta_{K+1}$ is the updated pulse width, and I is an integer.

5. The method of claim 4, wherein I is set to 0.

6. The method of claim 1, further comprising:
identifying a supplemental fault location index based on at least one supplemental fluctuating echo from the first pulse amplitude communication signal; and
determining the updated pulse width based on the initial pulse width, the identified first fault location index, and the identified supplemental fault location index.

7. The method of claim 1, wherein identifying a second fault location index comprises repeating the transmitting, the identifying, and the determining until one or more completion criteria are met.

8. The method of claim 7, wherein the one or more completion criteria comprise the updated pulse width being less than a predetermined pulse width.

9. The method of claim 1, wherein the first pulse amplitude communication signal is a variable data rate signal.

10. The method of claim 1, wherein the telecommunication line comprises a band-limited channel, and a Signal to Noise Ratio (SNR) of the first pulse amplitude communication signal is used in determining the updated pulse width.

11. The method of claim 10, wherein determining an updated pulse width comprises reducing the updated pulse width if the SNR is higher than a predetermined threshold.

12. The method of claim 10, wherein determining an updated pulse width comprises increasing the updated pulse width if the SNR is lower than a predetermined threshold.

13. A system, comprising:
a variable pulse width transmitter configured to transmit signals on a telecommunication line; and
one or more processors that interact with the variable pulse width transmitter and are configured to:
cause the variable pulse width transmitter to transmit a first pulse amplitude communication signal having an initial pulse width; and
after causing the variable pulse width transmitter to transmit the first pulse amplitude communication signal on the telecommunication line:
identify a first fault location index based on at least one fluctuating echo of the first pulse amplitude communication signal, wherein the first fault location index represents a location of a fault on the telecommunications line;
determine an updated pulse amplitude communication signal having an updated pulse width based on the initial pulse width and the identified first fault location index;
cause the variable pulse width transmitter to transmit a second pulse amplitude communication signal having the updated pulse width on the telecommunication line; and
identify a second fault location index based on at least one fluctuating echo of the second pulse amplitude communication signal having the updated pulse width, wherein the second fault location index represents an updated location of the fault on the telecommunications line.

14. The system of claim 13, wherein determining the updated pulse width comprises determining the updated pulse width based on at least one inequality relationship of the first fault location index and the initial pulse width.

15. The system of claim 14, wherein the at least one inequality relationship comprises:

$$(N_{k+1}+I) \times \Delta_{K+1} > (N_k - \tfrac{1}{2}) \times \Delta_K;\ \text{and}$$

$$(N_{k+1}+I+1) \times \Delta_{K+1} < (N_k + \tfrac{1}{2}) \times \Delta K,$$

wherein $N_k$ is the first fault location index, $N_{k+1}$ is the second fault location index, $\Delta_K$ is the initial pulse width, $\Delta_{K+1}$ is the updated pulse width, and I is an integer.

16. The system of claim 15, wherein the integer I is set to 0.

17. The system of claim 13, wherein the one or more processors further configured to:
identify a supplemental fault location index based on at least one supplemental fluctuating echo from the first pulse amplitude communication signal; and
determine an updated pulse width based on the initial pulse width, the identified first fault location index, and the identified supplemental fault location index.

18. The system of claim 13, wherein identifying a second fault location index comprises repeating the causing, the identifying, and the determining until one or more completion criteria are met.

19. The system of claim 18, wherein the one or more completion criteria comprise the updated pulse width being less than a predetermined pulse width.

20. The system of claim 13, wherein the first pulse amplitude communication signal is a variable data rate signal.

21. An apparatus comprising instructions embodied on a tangible, non-transitory computer-readable medium, the instructions operable when executed to cause the apparatus to perform operations comprising:
transmitting, on a telecommunication line, a first pulse amplitude communication signal having an initial pulse width; and
after transmitting the first pulse amplitude communication signal on the telecommunication line:
identifying a first fault location index based on at least one fluctuating echo of the first pulse amplitude communication signal, wherein the first fault location index represents a location of a fault on the telecommunications line;
determining an updated pulse amplitude communication signal having an updated pulse width based on the initial pulse width and the identified first fault location index;
transmitting, on the telecommunication line, a second pulse amplitude communication signal having the updated pulse width; and
identifying a second fault location index based on at least one fluctuating echo of the second pulse amplitude communication signal having the updated pulse width, wherein the second fault location index represents an updated location of the fault on the telecommunications line.

22. The apparatus of claim 21, wherein determining the updated pulse width comprises determining the updated pulse width based on at least one inequality relationship of the first fault location index and the initial pulse width.

23. The apparatus of claim 22, wherein the at least one inequality relationship comprises:

$$(N_{k+1}+I) \times \Delta_{K+1} > (N_k - \tfrac{1}{2}) \times \Delta_K; \text{ and}$$

$$(N_{k+1}+I+1) \times \Delta_{K+1} < (N_k + \tfrac{1}{2}) \times \Delta K,$$

wherein $N_k$ is the first fault location index, $N_{k+1}$ is the second fault location index, $\Delta_K$ is the initial pulse width, $\Delta_{K+1}$ is the updated pulse width, and I is an integer.

24. The apparatus of claim 23, wherein the integer I is set to 0.

25. The apparatus of claim 21, wherein the operations further comprise:
 identifying a supplemental fault location index based on at least one supplemental fluctuating echo from the first pulse amplitude communication signal; and
 determining the updated pulse width based on the initial pulse width, the identified first fault location index, and the identified supplemental fault location index.

26. The apparatus of claim 21, wherein identifying a second fault location index comprises repeating the transmitting, the identifying, and the determining until one or more completion criteria are met.

27. The apparatus of claim 26, wherein the one or more completion criteria comprise the updated pulse width being less than a predetermined pulse width.

28. The apparatus of claim 21, wherein the first pulse amplitude communication signal is a variable data rate signal.

* * * * *

UNITED STATES PATENT AND TRADEMARK OFFICE
CERTIFICATE OF CORRECTION

PATENT NO. : 10,148,491 B2
APPLICATION NO. : 14/861130
DATED : December 4, 2018
INVENTOR(S) : Arlynn W. Wilson Page 1 of 1

It is certified that error appears in the above-identified patent and that said Letters Patent is hereby corrected as shown below:

In the Claims

Column 11, Line 16, Claim 4, delete " $(N_{k+1} + l + 1) \times \Delta_{K+1} < (N_k + ½) \times \Delta K$ " and insert therefor -- $(N_{k+1} + l + 1) \times \Delta_{K+1} < (N_k + ½) \times \Delta_K$ --;

Column 12, Line 20, Claim 15, delete " $(N_{k+1} + l + 1) \times \Delta_{K+1} < (N_k + ½) \times \Delta K$ " and insert therefor -- $(N_{k+1} + l + 1) \times \Delta_{K+1} < (N_k + ½) \times \Delta_K$ --; and Column 13, Line 14, Claim 23, delete " $(N_{k+1} + l + 1) \times \Delta_{K+1} < (N_k + ½) \times \Delta K$ " and insert therefor -- $(N_{k+1} + l + 1) \times \Delta_{K+1} < (N_k + ½) \times \Delta_K$ --.

Signed and Sealed this
Twenty-second Day of January, 2019

Andrei Iancu
*Director of the United States Patent and Trademark Office*